US012601212B2

(12) United States Patent
Harger, II et al.

(10) Patent No.: US 12,601,212 B2
(45) Date of Patent: Apr. 14, 2026

(54) VEHICLE DOOR HINGE

(71) Applicant: FCA US LLC, Auburn Hills, MI (US)

(72) Inventors: Anthony J Harger, II, Flint, MI (US); David K Simancik, Lapeer, MI (US); Mark L Lusky, Harrison Township, MI (US)

(73) Assignee: FCA US LLC, Auburn Hills, MI (US)

( * ) Notice: Subject to any disclaimer, the term of this patent is extended or adjusted under 35 U.S.C. 154(b) by 40 days.

(21) Appl. No.: 18/326,052

(22) Filed: May 31, 2023

(65) Prior Publication Data

US 2024/0401388 A1 Dec. 5, 2024

(51) Int. Cl.
*E05D 7/10* (2006.01)
*E05D 3/02* (2006.01)

(52) U.S. Cl.
CPC ............. *E05D 7/1005* (2013.01); *E05D 3/02* (2013.01)

(58) Field of Classification Search
CPC ....... E05D 7/1005; E05D 3/02; E05D 15/507; E05D 5/14
See application file for complete search history.

(56) References Cited

U.S. PATENT DOCUMENTS 106,315 A * 8/1870 Browne .................. E05D 7/105 12/136 R
2,012,800 A * 8/1935 Allen .................... E05D 7/1005 16/385
2,677,147 A * 5/1954 Phillips ................... E05D 7/105 16/266
3,431,591 A * 3/1969 Betso ...................... E05D 7/105 16/265
3,905,065 A * 9/1975 Seeger .................... E05D 11/06 16/317

(Continued)

FOREIGN PATENT DOCUMENTS

AU 2004100407 A4 7/2004
DE 2628952 A1 * 1/1978

(Continued)

OTHER PUBLICATIONS

International Search Report and Written Opinion dated Aug. 12, 2024 for International Application No. PCT/US2024/027151, Filing Date May 1, 2024.

*Primary Examiner* — Jason W San
*Assistant Examiner* — Matthew J Sullivan
(74) *Attorney, Agent, or Firm* — Jeremy J. Klobucar

(57) ABSTRACT

A hinge for a vehicle has a first and second leaf. The first leaf includes a barrel or knuckle to receive a pin. The barrel or knuckle has a first and second end. The second leaf includes an opening to receive the barrel or knuckle. A pair of legs extend from a body defining the opening. A first leg has the pin to insert into the first end of the barrel or knuckle. The pin extends into the knuckle. A second leg extends adjacent to the second end of the barrel or knuckle so that in a first or closed position, the second leg contacts or blocks the barrel or knuckle when the second leaf is moved axial along an axis of the pin to remove the door. When the second leaf moves to a second position with respect to the first leaf, the second leg clears the barrel or knuckle to enable movement of the second leaf along the pin axis to enable removal of the pin from the barrel or knuckle.

8 Claims, 4 Drawing Sheets

(56) References Cited

U.S. PATENT DOCUMENTS

| | | | | | |
|---|---|---|---|---|---|
| 4,334,338 | A * | 6/1982 | Conn | E05D 7/105 16/266 |
| 4,584,739 | A * | 4/1986 | Konen | E05D 7/105 16/266 |
| 4,675,940 | A * | 6/1987 | Brockhaus | E05D 5/127 16/385 |
| 4,800,623 | A * | 1/1989 | Brockhaus | E05D 7/105 16/386 |
| 5,269,046 | A * | 12/1993 | Newby, Sr. | E05D 7/1072 16/386 |
| 5,669,106 | A * | 9/1997 | Daoud | E05D 7/105 16/265 |
| 5,682,646 | A | 11/1997 | Tyler, IV et al. | |
| 6,070,297 | A * | 6/2000 | Borer | E05D 7/105 16/389 |
| 6,099,097 | A * | 8/2000 | Hocker | G06F 1/181 16/257 |
| 7,325,276 | B2 * | 2/2008 | Kim | E05D 5/128 16/262 |
| 7,549,691 | B2 | 6/2009 | Schulte et al. | |
| 8,061,753 | B2 | 11/2011 | Papanikolaou et al. | |
| 8,556,330 | B2 * | 10/2013 | Lazarevich | E05D 7/1005 16/334 |
| 9,097,045 | B2 * | 8/2015 | Hausler | E05D 7/1072 |
| 9,169,679 | B2 * | 10/2015 | McAdoo | E05D 3/02 |
| 9,260,898 | B2 * | 2/2016 | Soma | E05D 7/105 |
| 9,994,263 | B1 | 6/2018 | Richter | |
| 10,119,313 | B2 | 11/2018 | Higgins et al. | |
| 10,293,868 | B2 | 5/2019 | Jergess et al. | |
| 10,550,615 | B2 * | 2/2020 | Cherry | E05D 7/1005 |
| 10,724,279 | B2 * | 7/2020 | Wilke | E05D 7/1022 |
| 10,738,520 | B2 * | 8/2020 | Cherry | E05D 11/06 |
| 10,820,641 | B2 * | 11/2020 | Pandolfino | A44B 6/00 |
| 10,851,570 | B2 * | 12/2020 | Smith | E05D 7/105 |
| 10,920,472 | B2 | 2/2021 | Trentin et al. | |
| 10,941,598 | B2 * | 3/2021 | Cherry | E05D 7/1005 |
| 11,473,357 | B2 * | 10/2022 | Bender | E05D 7/10 |
| D986,016 | S * | 5/2023 | Harger | D8/14 |
| 11,746,581 | B2 * | 9/2023 | Krolewski | E05D 7/1016 16/380 |
| 11,927,042 | B2 * | 3/2024 | Brewster | B64C 1/1469 |
| 2017/0362868 | A1 * | 12/2017 | Veloso | E05D 7/1061 |
| 2021/0196085 | A1 * | 7/2021 | Placencia | E05D 7/1072 |
| 2023/0366249 | A1 * | 11/2023 | Nöthe | E05D 3/02 |

FOREIGN PATENT DOCUMENTS

| | | | | |
|---|---|---|---|---|
| DE | 2748185 | A1 * | 5/1979 | |
| DE | 3414401 | C2 * | 3/1989 | E05D 7/105 |
| DE | 102004025389 | B4 * | 5/2006 | E05D 3/12 |
| DE | 102009016265 | A1 | 10/2009 | |
| FR | 2576957 | A1 | 8/1986 | |
| FR | 2576959 | A1 * | 8/1986 | E05D 7/105 |
| FR | 2597915 | A1 * | 10/1987 | E05D 7/105 |
| GB | 2007755 | A * | 5/1979 | E05D 7/105 |
| GB | 1560816 | A * | 2/1980 | E05D 7/105 |
| GB | 2395227 | A * | 5/2004 | B65D 43/167 |

* cited by examiner

VEHICLE DOOR HINGE

FIELD

The present disclosure relates to vehicles and, more particularly, to a door hinge with a toolless removal component.

BACKGROUND

This section provides background information related to the present disclosure which is not necessarily prior art.

In the prior art, various types of door hinges are utilized on vehicles One such type of door hinge requires a nut to secure the hinge assembly that requires a tool for the door removal process. Thus, door hinge removal with a tool can be cumbersome and time consuming. Door hinges without connecting fasteners enable lifting off of the door at angles less than a full open position. This has the potential to affect the connecting components within the door system which require a disconnection before door removal (such as wire harnesses, door checks, etc.).

Additionally, various types of hinges require a T-40 nut to be secured to threads on the pivot pin. Thus, this requires a tool to remove the T-40 nut from the hinge prior to the door hinge being enabled to be lifted off of the body bracket. Accordingly, the hinge could be separated at any given angle after the nut is removed. Thus, these hinges require tools during the hinge removal process. Lack of tools, loss of tools can prevent the door removal process from occurring. Utilization of tools for door hinge removal can cause scratches or the like to the door if the tool is misused. Additionally, this requires additional steps and time to perform the door removal process when a tool is required. Also, the side door can be lifted off at any angle after the nut is removed. This results in the possibility of lifting off the side door prior to the door check link detachment.

Additionally, the nuts can be damaged during removal or installation process. The nut or the joint can be over torqued which results in stripped threads. When the nut gets cross-threaded, this results in stripped threads, damage to the lead in screw and prevents nut removal which obstructs the side door from being removed. Repetition removal, reinstallation of the nut induces wear within the joint. This may enable accelerated corrosion and prohibit further removal. Also, loose fasteners can get lost in between removal and installation. Also, numerous components create pivot bearing surfaces resulting in numerous sources of friction or rotatable torque variation. Also, entrapment of debris or containments is enabled between the nut and pivot pin due to opposing installation directions.

The disclosure provides a door hinge for a vehicle that prevents removal due to a bracket leg extending under the leaf barrel in a closed position. The present hinge enables removal or liftoff of the door due to the leg clearing the barrel when opened beyond a fully opened position. The present disclosure provides a pivot pin that extends through the barrel of the body racket or leaf.

SUMMARY

This section provides a general summary of the disclosure, and is not a comprehensive disclosure of its full scope or all of its features.

According to a first object of the disclosure, a hinge for a vehicle comprising a first and second leaf. The first leaf includes a barrel or knuckle to receive a pin. The barrel or knuckle has a first and second end. The second leaf includes an opening to receive the barrel or knuckle. A pair of legs extend from a body defining the opening. A first leg includes a pin to insert into the first end of the barrel or knuckle. The pin extends into the knuckle. A second leg extends adjacent to the second end of the barrel or knuckle so that in a first or closed position, the second leg blocks removal of the second leaf from the barrel or knuckle when the second leaf is moved axial along an axis of the pin to remove the door. When the second leaf moves to a second position with respect to the first leaf, the second leg clears the barrel or knuckle to enable movement of the second leaf along the pin axis to enable removal of the pin from the first leaf barrel or knuckle. The second leg has a reduced thickness and a curved portion to provide clearance for the second leaf. The second leaf has a barrel or knuckle to which the pin is fixed. The first leaf barrel or knuckle includes a pivot bushing. The pin extends through and past the second end of the first leaf barrel or knuckle. The pin includes a tapered end.

According to a second aspect of the disclosure, a vehicle door comprises a body with two sides with one of the sides including a hinge construction. The hinge construction comprises a first and second leaf. The first leaf includes a barrel or knuckle to receive a pin. The barrel or knuckle has a first and second end. The second leaf includes an opening to receive the barrel or knuckle. A pair of legs extend from a body defining the opening. A first leg includes a pin to insert into the first end of the barrel or knuckle. The pin extends into the knuckle. A second leg extends adjacent to the second end of the barrel or knuckle so that in a first or closed position, the second leg blocks removal of the second leaf from the barrel or knuckle when the second leaf is moved axial along an axis of the pin to remove the door. When the second leaf moves to a second position with respect to the first leaf, the second leg clears the barrel or knuckle to enable movement of the second leaf along the pin axis to enable removal of the pin from the first leaf barrel or knuckle. The second leg has a reduced thickness and a curved portion to provide clearance for the second leaf. The second leaf has a barrel or knuckle to which the pin is fixed. The first leaf barrel or knuckle includes a pivot bushing. The pin extends through and past the second end of the first leaf barrel or knuckle. The pin includes a tapered end.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
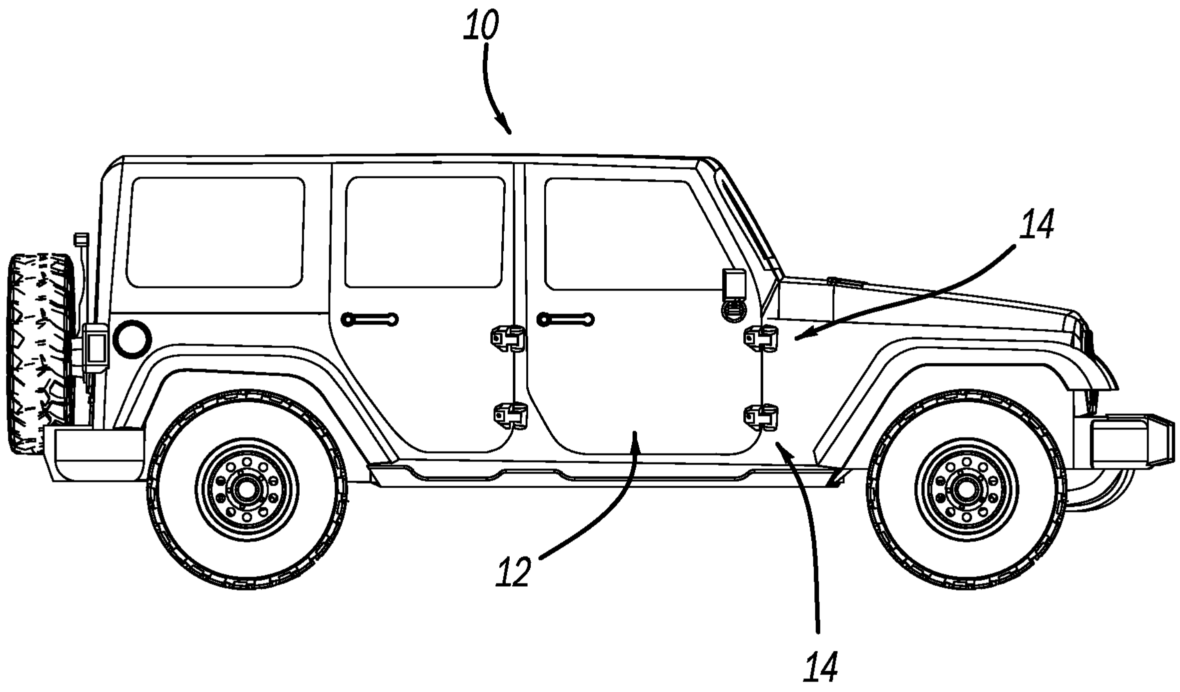
FIG. 1 is a side perspective view of a vehicle with a door including the hinge.

Example embodiments will now be described more fully with reference to the accompanying drawings.

Turning to the figures, a vehicle is illustrated and designated with the reference numeral 10. The vehicle includes a side door 12 with a pair of hinges 14 to secure the door 12 to the vehicle 10. The door 12 may include a tubular construction or could be a solid construction if desired. Also, the door could be a tailgate, swing gate, lift gate, hood or the like.

The hinge 14 includes a body bracket or leaf 16. The leaf 16 includes a body 18 having apertures 20 to secure the leaf 16 with the vehicle 10. One end of the body 18 includes a barrel or knuckle 22. The barrel or knuckle 22 has a curved exterior with a bore 24 extending through the barrel 22. The bore 24 has a first end 26 and a second exit end 28. A pivot bushing 30 is positioned into the bore 24 to receive a pivot pin 50.

The hinge 14 includes a door bracket or second leaf 32. The leaf 32 includes a body 34 with apertures 36 that receive fasteners 38 to secure the second leaf 32 with the door 12. The body 34 includes a first leg 40 and a second leg 42 defining an opening 44. This provides the body with an overall U shape.

The first leg 40 includes a knuckle or barrel 46. The knuckle or barrel 46 includes a bore 48 that may be threaded or the like to receive the pivot pin 50. Thus, the pivot pin 50 is secured in the first leg barrel or knuckle 46. The pivot pin 50 includes a flange 52 prohibiting further insertion into the knuckle bore 48. Also, the pin 50 has a tapered portion 54 at its end to enable easy insertion into the pivot bushing 30. The pin 50 generally has a circular cylindrical shape, however, any desired shape could be utilized that fits within the pivot bushing 30 to enable the pin 50 to rotate within the pivot bushing 30.

Figure 5:
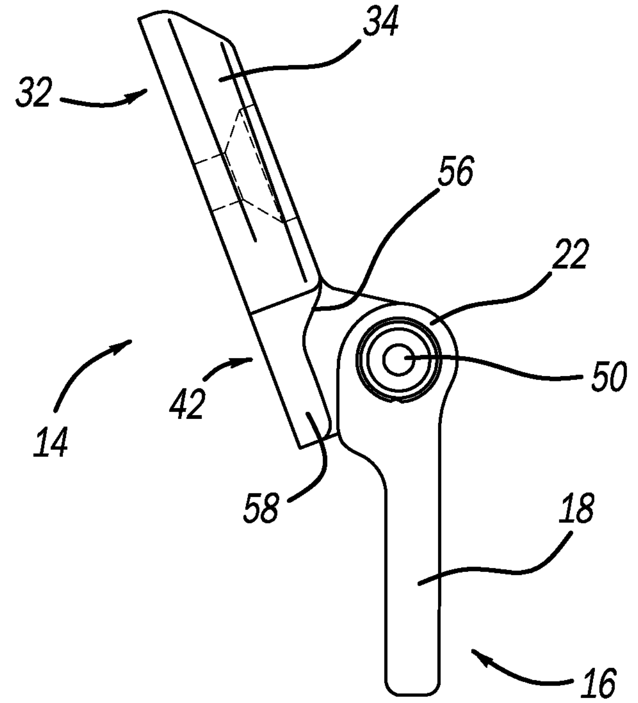
FIG. 5 is a bottom plan view of FIG. 4.
Figure 6:
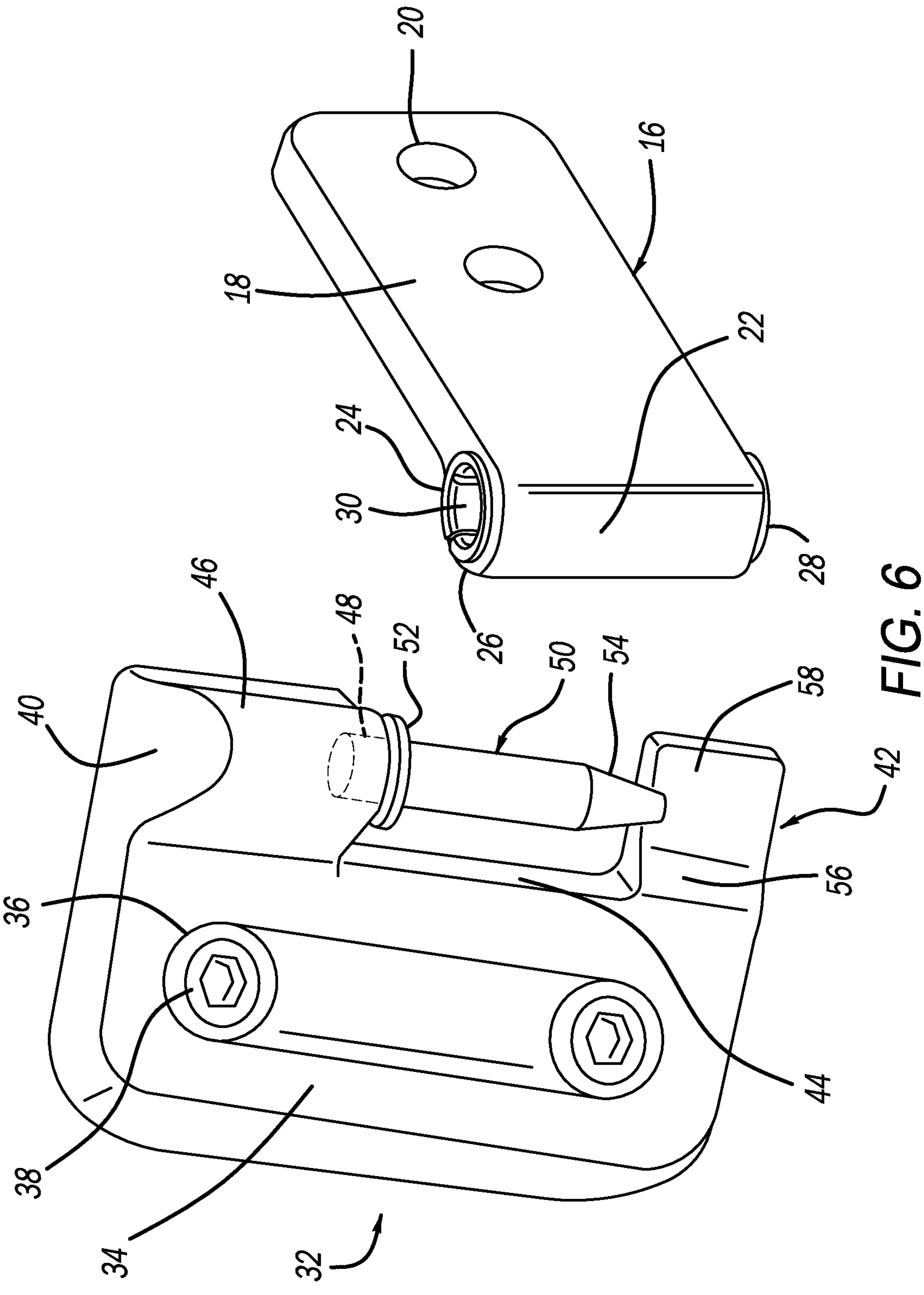
FIG. 6 is an exploded perspective view of the hinge.

The second leg 42 has a curved portion 56 and a reduced thickness portion 58. The curved portion 56 corresponds to the outer surface of the barrel or knuckle 22. The thin or reduced thickness portion 58 provides clearance for the second leaf in a fully opened position as seen in FIG. 5. Here the knuckle 22 can be tuned. Also, the reduced thickness portion 58 can be reduced to a desired amount to tune the thickness or shape to ensure lift off prevention up to a specific angle of the hinge.

Figure 2:
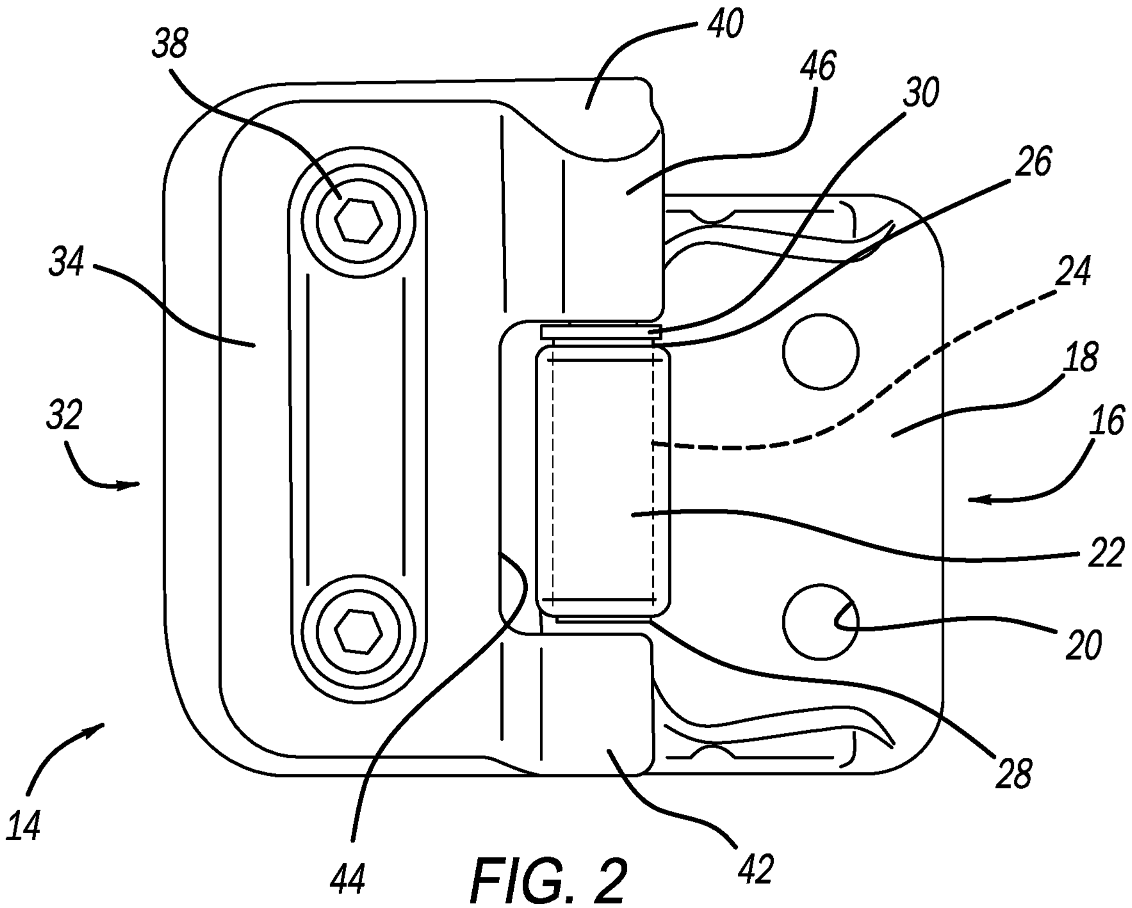
FIG. 2 is an elevation of the hinge in a closed position.
Figure 3:
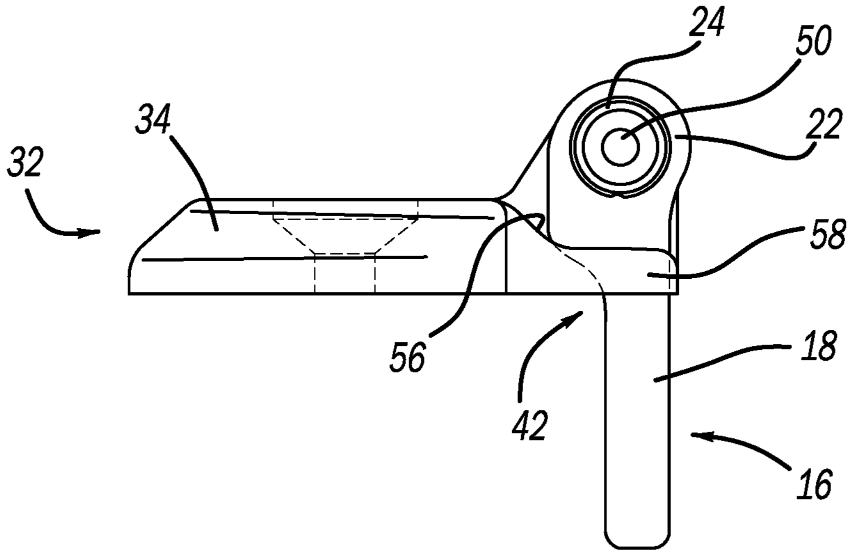
FIG. 3 is a bottom plan view of FIG. 2.
Figure 4:
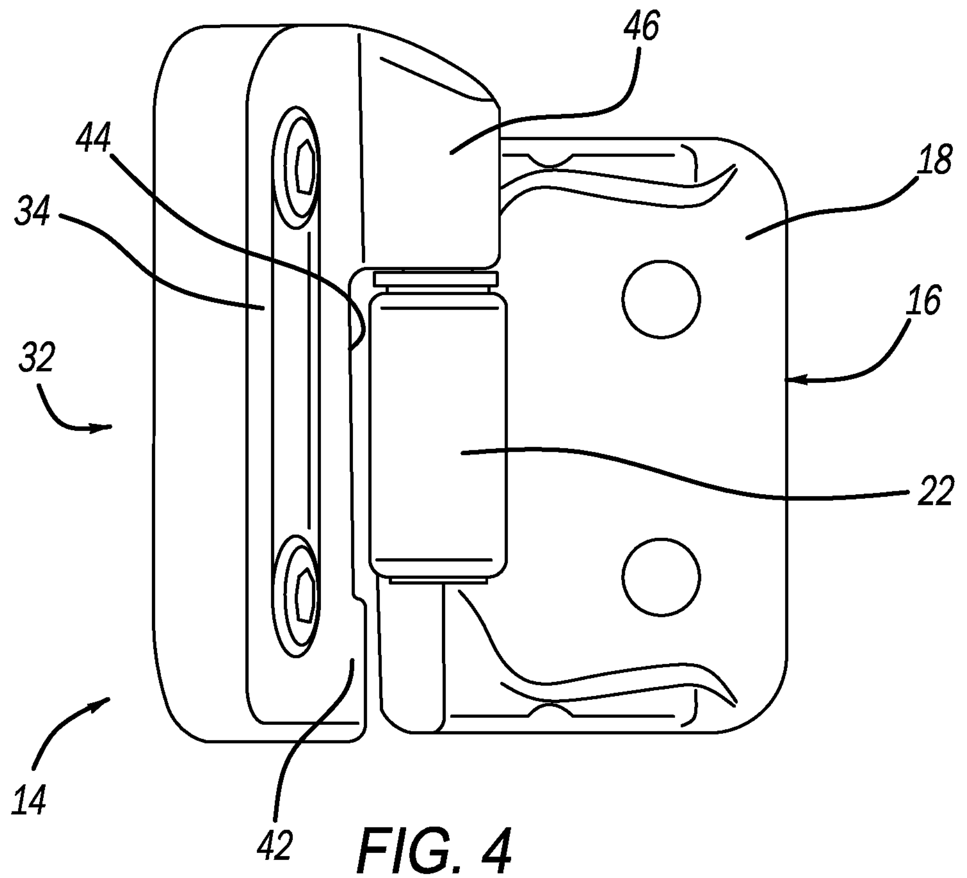
FIG. 4 is an elevation view of the hinge in an open position.

When the door 12 is in a closed position in FIG. 2, the first and second leaves 16,32 are substantially perpendicular to one another as illustrated in FIG. 3. The second leg 42 blocks axial removal of the door 12 from the first leaf 16. Thus, in the close position, the pin 50 is secured or positioned in the pivot bushing 30 with the second leg 42 blocking the second leaf 32 if the door is attempted to be moved upward in a first direction to remove the door 12 from the hinge 14.

As the door is moved to a fully open position, as illustrated in FIG. 5, the second leg 42 clears the knuckle or barrel 22 to enable axial removal of the door 12 from the hinge body bracket leaf 16. The thin portion 58 clears the barrel 22 so that the door 12 can be removed. Thus, the door 12 can be removed from the hinge body bracket leaf 16 without the need of tools. Thus, upon rotation of the door 12 from a closed to an open position, a user can move the door 12 axially along the axis of the pivot pin 50 to remove the pin 50 from the knuckle 22 and thus enable the door 12 to be removed from the vehicle 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hinge configured to connect a vehicle door to a vehicle body, the hinge comprising:

a first leaf configured to be fixed to one of the vehicle door and the vehicle body; and a second leaf configured to be fixed to the other of the vehicle door and the vehicle body;

wherein the first leaf includes a first body including a first end connected to the one of the vehicle door and the vehicle body and an opposite second end that defines each of a first leg that extends away from the first body and defines a first barrel and a second leg that extends away from the first body and is spaced apart from the first leg by an opening, a length of the first leg being equal to a length of the second leg;

the second leaf includes a second body having a third end connected to the other of the vehicle door and the vehicle body and an opposite fourth end that defines a second barrel that extends away from the second body and is configured for receipt in the opening between the first leg and the second leg;

the first barrel includes a pivot pin defining a pivot axis connected thereto and the second barrel includes a bore configured for receipt of the pivot pin such that when the pivot pin is received within the bore the first and second leaves can pivot relative to one another between a closed position and a fully open position about the pivot axis;

the first body includes a planar major surface configured to contact the one of the vehicle door and the vehicle body and an opposite major surface configured to face away from the one of the vehicle door and the vehicle body;

the second leg includes a proximate portion connected to second end of the first body and a distal portion positioned furthest away from the second end, a thickness of the second leg decreasing as the second leg extends between the proximate portion and the distal portion;

the second leg includes a surface configured to contact the one of the vehicle door and the vehicle body that is coplanar with the planar major surface of the first body and an opposite surface that faces away from the one of the vehicle door and the vehicle body and is connected to the opposite major surface of the first body by a curved surface between the proximate portion and the distal portion, the opposite surface of the second leg being arranged in parallel to the surface of the second leg that is configured to contact the one of the vehicle door and the vehicle body;

in the closed position, the distal portion of the second leg is configured to abut the second barrel and prevent axial movement of the first leaf relative to the second leaf along the pivot axis; and in the fully open position, the distal portion of the second leg is clear of the second barrel due to the second leg having the thickness that decreases as the second leg extends between the proximate portion and the distal portion so as to permit axial movement of the first leaf relative to the second leaf along the pivot axis.

2. The hinge according to claim 1, wherein the pivot pin is fixed to the first barrel.

3. The hinge according to claim 1, wherein the second barrel includes a pivot bushing provided in the bore.

4. The hinge according to claim 1, wherein the pin includes a tapered end.

5. A hinge configured to connect a vehicle door to a vehicle body, the hinge comprising:

a first leaf configured to be fixed to the vehicle door; and a second leaf configured to be fixed to the vehicle body;

wherein the first leaf includes a first body including a first end connected to the vehicle door and an opposite second end that defines each of a first leg that extends away from the first body and defines a first barrel and a second leg that extends away from the first body and is spaced apart from the first leg by an opening, a length of the first leg being equal to a length of the second leg;

the second leaf includes a second body having a third end connected to the vehicle body and an opposite fourth end that defines a second barrel that extends away from the second body and is configured for receipt in the opening between the first leg and the second leg;

the first barrel includes a pivot pin defining a pivot axis connected thereto and the second barrel includes a bore configured for receipt of the pivot pin such that when the pivot pin is received within the bore the vehicle door having the first leaf attached thereto can pivot relative to the second leaf fixed to the vehicle body between a closed position and a fully open position about the pivot axis;

the first body includes a planar major surface configured to contact the vehicle door and an opposite major surface configured to face away from the vehicle door;

the second leg includes a proximate portion connected to second end of the first body and a distal portion positioned furthest away from the second end, a thickness of the second leg decreasing as the second leg extends between the proximate portion and the distal portion;

the second leg includes a surface configured to contact the vehicle door that is coplanar with the planar major surface of the first body and an opposite surface that faces away from the vehicle door and is connected to the opposite major surface of the first body by a curved surface between the proximate portion and the distal portion, the opposite surface of the second leg being arranged in parallel to the surface of the second leg that is configured to contact the vehicle door;

in the closed position, the distal portion of the second leg is configured to abut the second barrel and prevent axial movement of the first leaf relative to the second leaf along the pivot axis; and in the fully open position, the distal portion of the second leg is clear of the second barrel due to the second leg having the thickness that decreases as the second leg extends between the proximate portion and the distal portion so as to permit axial movement of the first leaf relative to the second leaf along the pivot axis.

6. The hinge according to claim 5, wherein the pivot pin is fixed to the first barrel.

7. The hinge according to claim 5, wherein the second barrel includes a pivot bushing provided in the bore.

8. The hinge according to claim 5, wherein the pin includes a tapered end.

* * * * *